Jan. 19, 1943.   V. W. PETERSON ET AL   2,308,712
PRESS AND THE LIKE
Filed Oct. 22, 1937   3 Sheets-Sheet 1

Inventors:
Victor W. Peterson and
Otto J. Maha
By: Roland C. Rehm
Atty.

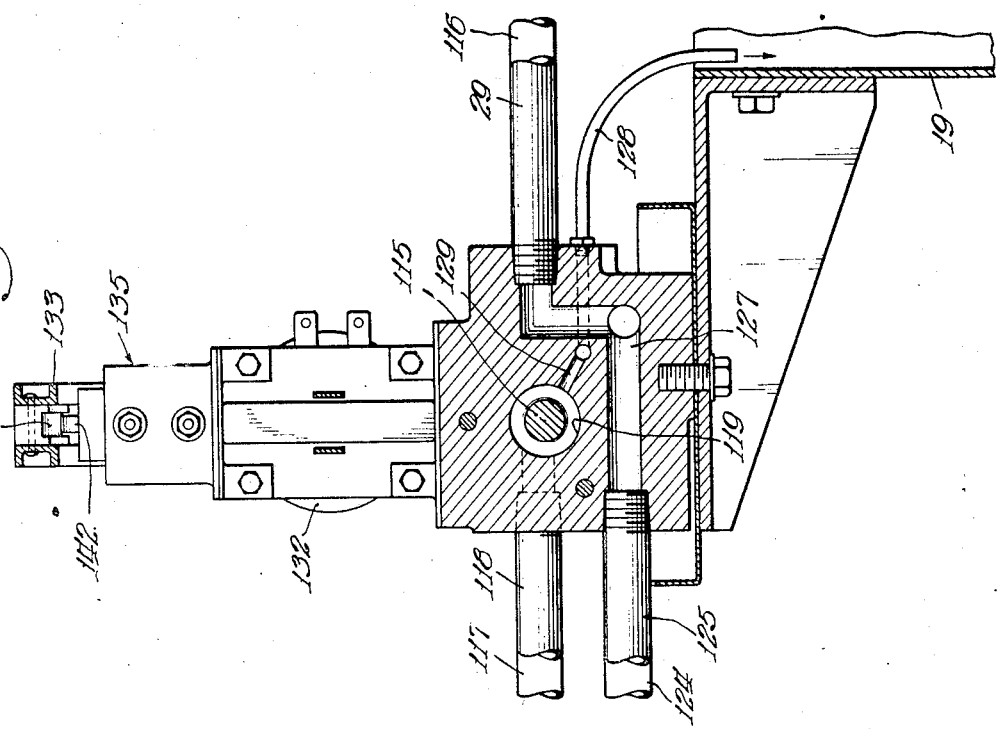
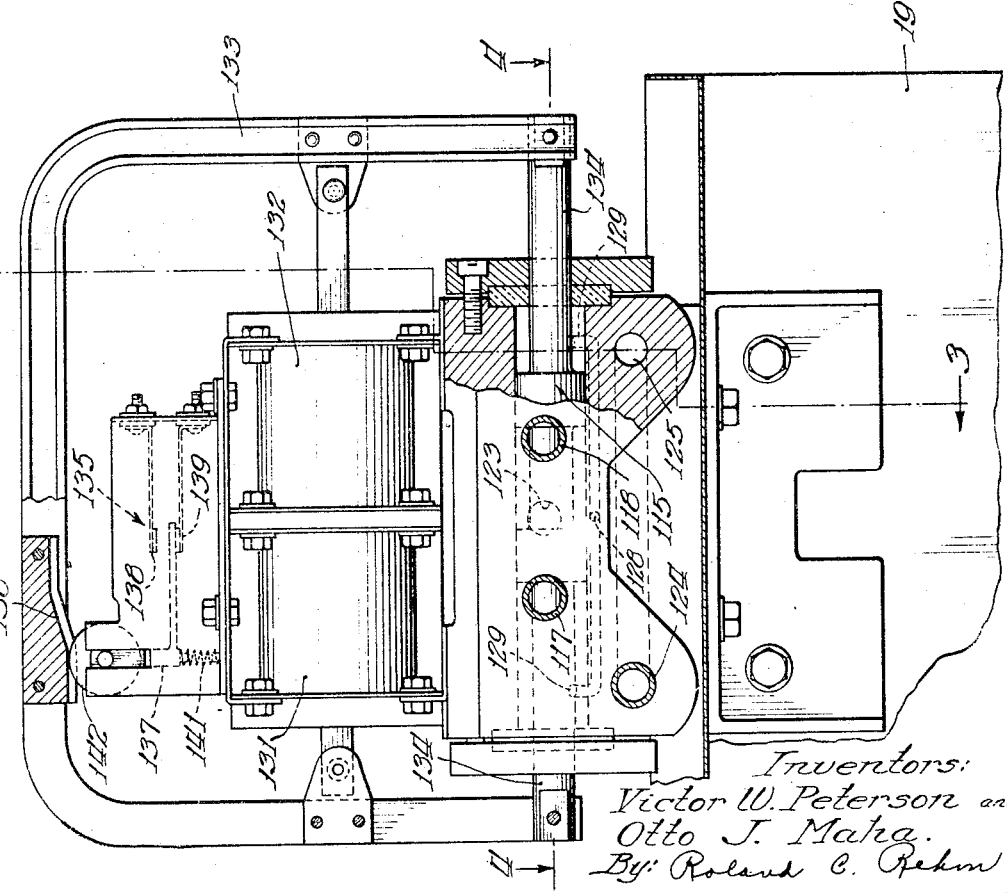

Jan. 19, 1943.  V. W. PETERSON ET AL  2,308,712
PRESS AND THE LIKE
Filed Oct. 22, 1937   3 Sheets-Sheet 3
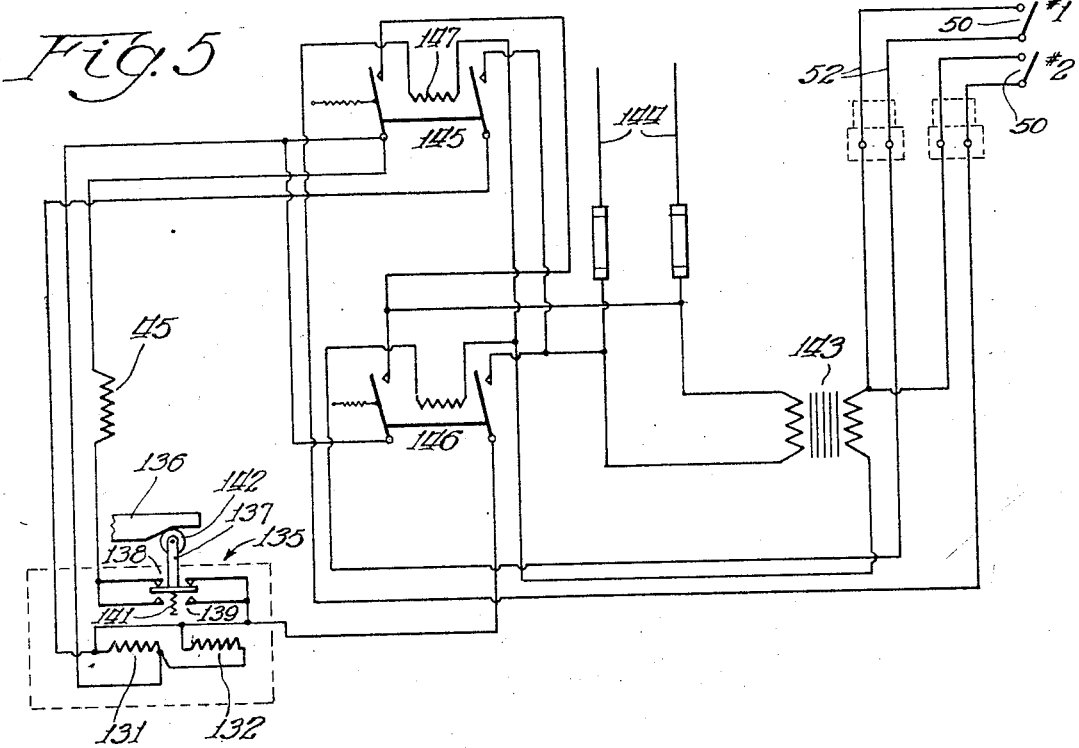
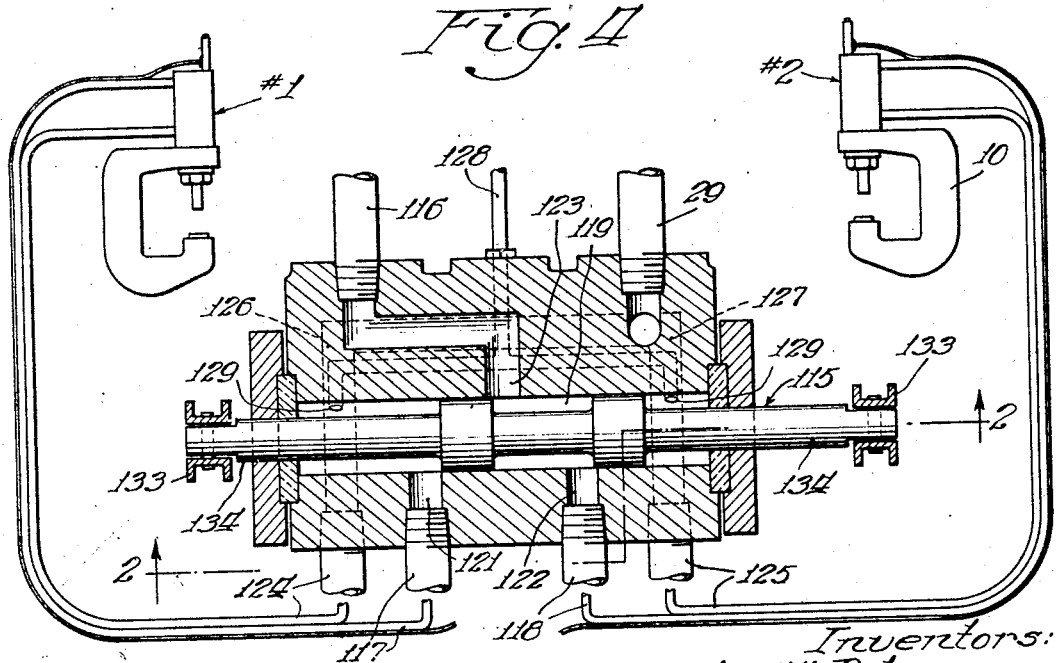
Inventors:
Victor W. Peterson and
Otto J. Maha.
By Roland C. Rehm
Atty.

Patented Jan. 19, 1943

2,308,712

UNITED STATES PATENT OFFICE 2,308,712

PRESS AND THE LIKE

Victor W. Peterson and Otto J. Maha, Chicago, Ill., assignors to Hannifin Manufacturing Co., Chicago, Ill., a corporation of Illinois Application October 22, 1937, Serial No. 170,407

7 Claims. (Cl. 60—54.5)

This invention relates to riveting and other presses, and, among other objects, aims to provide a compact unit which is rapid in operation and yet is capable of exerting high pressures at the appropriate point in the cycle of operations.

The invention may be readily understood by one illustrative apparatus embodying the invention and shown in the accompanying drawings.

In said drawings:

Fig. 2 is an elevation, partly in section, of a shuttle valve and its operating mechanism;

Fig. 3 is a transverse section taken on the plane 3—3 of Fig. 2;

Fig. 4 is a plan section taken on the plane 4—4 of Fig. 2; and

Fig. 5 is a diagram illustrating certain electrical control circuits.

Figure 1:
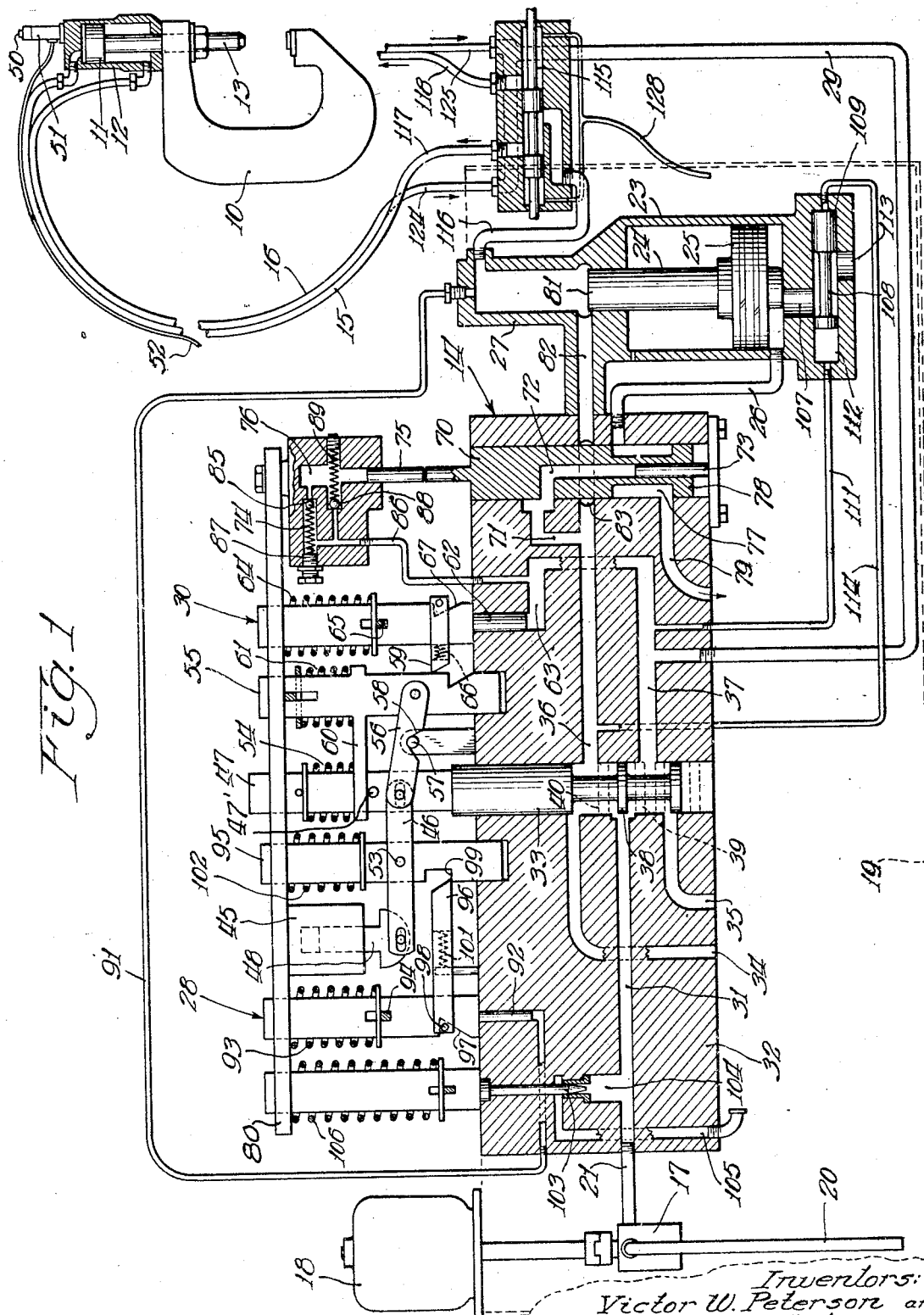
Fig. 1 is a view in the form of a diagrammatic section illustrating the apparatus.

While the invention is here shown associated with a riveting press connected with the power unit by flexible lines, it will be apparent that the invention is capable of use in other apparatus requiring the exertion of high pressure at some point in the cycle of operations. The illustrative apparatus is designed to cold head rivets of substantial size, for example ⅜″ soft steel rivets, and in this instance is made extremely mobile in character so that the riveting yoke 10 can be shifted quickly and easily from rivet to rivet.

The riveting yoke is made relatively small and light in weight by the use of heat-treated alloy steel (having unit strength of 175,000 pounds per square inch) to increase its mobility and to render it capable of reaching rivets which have heretofore been difficult of access. The illustrative riveter yoke with its operating piston 11 and cylinder 12 weighs only about fifty pounds, yet is able to exert a pressure of about 35,000 pounds, sufficient to cold head a ⅜″ rivet. The use of flexible lines makes it possible therefore to shift from one rivet to the next more easily and quickly than heretofore. Because of its small size such a riveting yoke is capable of reaching without difficulty accessible rivets which cannot ordinarily be subjected to cold heading.

The riveting tool 13 or other press plunger is advanced and retracted by fluid under pressure delivered alternately to opposite faces of piston 11 in the work cylinder 12. To secure rapid advance of the tool or plunger into operative engagement with the work, fluid is supplied to the head end of the cylinder in large volumes at relatively low pressures up to approximately one thousand pounds per square inch. These are sufficient to close the tool quickly on the work and, in the case of a rivet, undoubtedly will commence the heading of the rivet. Thereafter the power apparatus is designed to supply intensified pressures, e. g. up to about five thousand pounds per square inch to complete the heading of the rivet or other pressing or punching operation. Upon completion of the operation, fluid is supplied to the opposite face of the piston 11 to provide a relatively rapid return.

The foregoing sequence of operations, including the supply of intensified pressure to the work cylinders, makes it possible to design a lightweight tool of such mobility as substantially to increase the speed with which the tool may be moved into engagement with the work and withdrawn from the work, thereby very substantially shortening the operation of a cycle of operations. As here shown, the riveter or other press is connected with the power unit 14 through flexible hose lines 15 and 16, the former transmitting fluid for the advance or power stroke and the latter for the return stroke. The flexible hose capable of transmitting the aforesaid high pressure without excessive expansion or distortion may be secured upon the open market. One satisfactory type comprises a reinforcing of woven wire wherein the strands run diagonally or spirally around the hose and are covered with a rubberized protective fabric. The inside of the hose is lined with a flexible leakproof composition. The wire reinforcing, while providing a flexible hose, is of such strength as to prevent undue expansion of the hose, thereby minimizing the volume of fluid (and therefore waste energy) consumed in expansion or stretching of portions of the apparatus under the high pressures developed. The primary fluid pressure is in this instance supplied by rotary vane pump 17 driven by electric motor 18 and capable of supplying oil or other pressure fluid in substantial volume, up to approximately one thousand pounds per square inch. The pump inlet, and indeed the pump, is immersed in a reservoir of oil carried in the case 19 of the apparatus, the oil entering the pump through inlet pipe 20 and being discharged therefrom through pipe 21. Except for periods when the press is actually in operation, fluid delivered by the pump is short-circuited or returned to the reservoir at practically zero pressure. During such idle periods, the motor operates at practically no load.

Direct pressure from the pump serves to actuate the press piston 11 on its forward and return strokes and the pump is of such capacity as to deliver large volumes of fluid at pressures up to one thousand pounds per square inch, thereby insuring rapid forward movement of the press piston and closing of the press upon the work. For the squeezing or high pressure operation, such as the completion of the heading of a rivet which requires but a very short movement of the press plunger, the fluid pressure delivered to the work cylinder is intensified by an intensifier 23 represented by small and large pistons 24 and 25. During operation of the intensifier, fluid is delivered from the pump through pipe 26 to the face of the large piston 24 which has four to five times the area of the small piston. The latter acts on the fluid confined in its cylinder 27 and that in the hose line 15 and work cylinder 12 (being already under approximately one thousand pounds per square inch pressure) and because of the ratio of piston areas is capable of increasing the pressure of the fluid thus confined up to approximately five thousand pounds per square inch, such pressure being ample, and indeed somewhat in excess of that necessary, to complete the operation. The volume of cylinder 27 is made sufficient to not only complete the power stroke of the press but adequate to compensate for the stretching or expansion of the apparatus and hose lines under the very high pressures developed.

The power stroke in this instance is terminated by controlling means in the form of a pressure responsive device 28 (Fig. 1) which operates to direct pump pressure through pipe 29 and return line 16 to the opposite or return face of the work piston and to open the head end of the work cylinder 12 and the intensifier to discharge or exhaust. The return stroke is, in this instance, under the control of a pressure responsive device 30 which operates when a predetermined pump pressure is reached to effect neutralization of the system by connecting both the pump and the return line 29 with discharge, thereby dropping the pump pressure to substantially zero and relieving the load on the motor.

In the present apparatus, the pump is connected through pipe 21 and passage 31 in the valve block 32 with controlling means represented by a main or primary valve 33 whose function it is to control delivery of pressure fluid to the work cylinder for effecting the forward and return strokes of its piston and for terminating movement of the piston at any point in the cycle. The valve is here shown in the form of a double spool or piston valve controlling the passages 34 and 35 leading to exhaust, the passage 36 leading to the power side of the work cylinder, and the passage 37 leading to the return side of the work piston. Valve 33 is illustrated in full lines in its neutral position wherein the pump is short-circuited (discharging fluid to its reservoir) and both passages 36 and 37 leading to opposite faces of the work piston are open to discharge. In its lower position, wherein the central web 38 of the valve is indicated by dotted lines 39, the valve connects the pump to the passage 36 (leading to the head of the work cylinder) and fully opens the return passage 37 to discharge through passage 35. In its upper position, wherein the web 38 occupies the dotted line position 40, the pump is connected to the reverse passage 37 and the passage 36 is connected to discharge through passage 34. The webs at the upper and lower ends of the valve spool serve, of course, to close the valve bore against leakage.

The primary valve is in this instance controlled by solenoid 45 through mechanism, including the controlling devices 28 and 30, designed to permit the valve to be shifted to its extreme or reversing position, both when the solenoid remains energized and when it is de-energized, and to permit the inauguration of a new cycle (after the solenoid has been de-energized) at any point in the return stroke of the work piston. It is possible, therefore, to arrest and effect the immediate return of the work plunger at any point in its forward stroke as where the work is incorrectly placed or for any other reason, and to avoid the delay incident to a full return of the work piston if this be not required. The foregoing secondary operations of the primary valve are in this instance effected by relatively shifting the fulcrum points of the floating lever 46 which connects the primary valve stem 47 with the solenoid armature 48. The solenoid may be energized by any appropriate control circuit. The control switch should preferably be located at some convenient point with reference to the work cylinder, such, for example, as in the form of a push button switch 50, at the end of the handle 51 on the riveter where it may be conveniently pressed by the operator's thumb which is normally placed over the end of the handle in the use of the tool. Lines 52 may lead from the control switch or push button 50 to a transformer and relay switch (presently described) by means of which the solenoid 45 is energized.

When armature 48 is actuated, lever 46 operates through its fulcrum 53 to depress the primary valve to position 39. To effect movement of the valve to reverse position (i. e. position 40) the returning spring 54 is automatically pre-compressed to a degree greater than that for holding it in the neutral position illustrated in full lines in Fig. 1, by means here shown in the form of a cocking pin 55. The latter may advantageously be elevated by secondary lever 56 connected with both valve stem 47 and the cocking pin and fulcrumed at an intermediate point 57. The connection of the lever with its fulcrum is such that the former may be elevated clear of the fulcrum upon the upward movement of the primary valve to reverse position. For that purpose the lever is appropriately notched at 58 to provide a seat for the fulcrum. The cocking pin is held in its cocked or spring-compressing position by a latch 59 controlled by the pressure responsive device 30 which is actuated upon a predetermined back pressure to withdraw the latch and allow the cocking pin to return to its unlatched position (that illustrated in Fig. 1) to restore the spring 54 to the normal condition necessary for a return of the primary valve to neutral position at the end of the cycle of operations. Cocking pin 55 carries an arm 60 upon which the end of spring 54 seats and by which the spring is additionally pre-compressed upon elevation of the cocking pin. The latter is returned to its uncocked position by spring 61.

The pressure responsive device 30 is here shown provided with a plunger 62 connected through passage 63 with the return pressure line 37. A pre-loaded spring 64 prevents elevation of plunger 62 until a predetermined back pressure has been reached. In the present instance such back pressure builds up when further return of piston 11 is prevented by its engagement of the cylinder head. The loading of spring 64 may be adjusted by a key 65 or in any other appropriate manner. Latch 59 is in this instance pressed toward the cocking pin by spring 66 and is withdrawn therefrom upon actuation of the pressure responsive device 30 by the cam surface 67 which engages the opposite end of latch 59. In this connection it will be understood that the pressure in the various passages, or more properly back pressure, is only what is necessary to overcome resistance to the movement of the work piston, and so long as such resistance increases, the pump pressure (and therefore the back pressure in such passages) will automatically increase until approximately the maximum pressure of which the pump is capable has been reached.

If solenoid 45 be de-energized at any point in the forward stroke of the work piston, spring 54 (having been additionally loaded by the cocking pin) will elevate the primary valve to its return position 40 (lifting lever 56 clear of its fulcrum 57). Such return position is maintained until either the solenoid be re-energized or until the cocking pin be released upon the actuation of the pressure responsive device to return the primary valve to neutral position.

When the press plunger has advanced until it closes upon the work and has exerted such pressure on the work as may be developed from primary pump pressure, the intensifier is then caused to operate. In the present instance the intensifier is caused to operate upon a predetermined pressure which is approximately the maximum pump pressure which the pump may readily develop, in this case from 900 to 1000 pounds per square inch. The intensifier control device is here shown in the form of a pressure responsive valve 70 which connects the pump pressure with the intensifier through passage 26. A limited area of valve 70 is exposed to pump pressure from passage 71 whose orifice registers with a small bore 72 inside the valve and tends to move the valve upwardly. The lower portion of the bore is closed by pin 73. The intensifier valve is, in this instance, controlled by pre-loaded spring 74 which is acted upon by plunger 75 registering with the end of valve 70 and adapted to be elevated by valve 70 when the pump pressure thereon has developed sufficiently to compress spring 74. The pressure is transmitted to the latter by the fluid confined in valve chamber 76. When the predetermined pressure is reached, valve 70 rises to connect the passages 36 and 26 by means of the passage 77 around the valve. At the same time, the lower end 78 of the valve cuts off discharge passage 79. Fluid pressure is thus delivered to the lower face of intensifier piston 25 causing its plunger 24 to intensify the pressure on the volume of oil confined in the intensifier cylinder 27 and the supply line as previously explained. Until the end 81 of the plunger 24 cuts off passage 82 (which is connected with passage 36 by the annular passage 83 around the intensifier valve), cylinder 27 is in communication with the pressure passage 36. Therefore full pump pressure is maintained on the work cylinder and there is, therefore, no substantial drop in pressure in the work cylinder while the intensifier cylinder is being started in action. This prevents any removal of stretch or slack in the apparatus which would have to be restored by the intensifier cylinder before high pressure could be delivered to the work cylinder.

The control devices for the intensifier are so designed that the intensifier valve once having been opened remains open regardless of subsequent variations in pump pressure. It will be understood that immediately upon actuation of the intensifier valve the pump pressure temporarily very materially drops. This results from the fact that whereas the intensifier was placed in operation when a pump pressure of say one thousand pounds per square inch was reached, such a high pressure is not immediately required on the intensifier piston 25 to maintain the previous pressure upon the work piston since the intensifier piston 25 is several times larger in area (in this instance about five times) than that of the intensifier plunger 24. Therefore, there is a temporary drop in pump pressure to approximately 200 pounds per square inch, a pressure very much less than that which was necessary to elevate the intensifier valve. Means are, therefore, provided for preventing the intensifier valve from returning and developing the chattering action which would result from the ensuing repeated increases and reduction in line pressure. Such means are shown in the present instance in the form of a valve 85 (in this case a ball valve) which allows the fluid in chamber 76 to escape through passage 86 to return line 37. The energy necessary to elevate valve 70 is thus dissipated by allowing the escape of the fluid and there is therefore nothing to cause the return of the valve so long as any pump pressure, however small, exists in line 36.

The loading on spring 74 to adjust it to open the valve at the proper pressure may be adjusted by the screw plug 87 against which the spring seats.

As shown in the diagram of Fig. 1, guiding and supporting means represented by bar 80 rigidly attached to valve block 32 is provided for supporting and guiding the various pressure responsive plungers and to form a seat for springs 64, 93, etc.

The return cycle of the press plunger is in this case commenced when a predetermined intensified pressure has been reached and at such predetermined pressure the control device 28 acts to effect the shifting of primary valve 33 to reverse position. When pressure thereupon develops in line 37, it is immediately transmitted through passage 86 and check valve 88 to plunger 75, thereby resulting in the immediate return of the intensifier valve to connect the intensifier cylinder 23 to discharge. The spring 89, which seats valve 88, may be a relatively weak spring inasmuch as the function of valve 88 is simply to prevent escape of fluid into passage 86 until a predetermined pressure has been reached sufficient to open valve 85.

Controlling device 28 is operated by intensified pressures in the intensifier cylinder 27 through pipe 91 which connects the intensifier cylinder with plunger 92 carried by the controlling device. The plunger is held down by a pre-loaded spring 93 whose pressure is adjusted so as to require the development of a predetermined intensified pressure before elevation of plunger 92 can occur. Adjustment in tension of the spring may be effected by the key 94 or in any other appropriate way. The primary valve is in this instance shifted to the aforesaid return position when the predetermined intensified pressure is reached by release of the fulcrum 53 of its controlling lever 46 to allow spring 54 to raise the valve to reverse position as previously described. Fulcrum 53 is in this instance carried upon a fulcrum pin 95 which is normally held against movement by a latch 96. The latter is released upon the movement of plunger 92 by a cam surface 97 on control device 28 which acts on a transverse pin 98 carried by the latch to withdraw it from its seat 99. Normally the latch is pressed toward fulcrum pin 95 by spring 101. Fulcrum pin 95 is normally pressed downward into position to be engaged by latch 96 by spring 102. Such spring is advantageously made light so as not to interpose any substantial resistance to the operation of spring 54 in elevating primary valve to reverse position. In this connection it will be noted that the latter valve is thus operated regardless of whether or not solenoid 45 is energized inasmuch as fulcrum 53 is then free to be raised to such position as may be necessary under the action of spring 54.

When the work piston reaches the end of its return stroke, its resistance to further movement causes a rising of back pressure in return line 37 which is communicated to passage 63 and results in the elevation of plunger 62 and the control device 30 when the predetermined back pressure (depending upon the pre-loading of spring 64) has been reached. This results in the release of cocking pin 55 and its return to uncocked position as shown in Fig. 1. Lowering of the seat 60 upon which spring 54 rests automatically results in the lowering of primary valve 33 to neutral position. This is effected in this instance by engagement of the seat 60 with pin 47' on valve stem 47. As soon as the pressure in intensifier cylinder 27 has been reduced, control device 28 returns to normal position, releasing latch 96 and, providing the operator has released the push button to de-energize solenoid 45, permitting the lowering of the fulcrum pin 95 and relatching of it and its fulcrum 53 in lowered or operating position. If the operator does not de-energize solenoid 45 during the return stroke of the work piston, fulcrum pin 95 cannot be returned and latched in operating position and the primary valve, therefore, cannot be operated to start a new cycle but will be returned and will remain in neutral position. It is, therefore, necessary in order to repeat the cycle of operations for the operator deliberately to de-energize solenoid 45. A new cycle cannot be accidentally started through inattention of the operator. Once de-energized, fulcrum pin 95 is immediately reset. Thereupon if solenoid 45 be re-energized even at any point in the return stroke of the work piston, the primary valve will be immediately shifted to forward position and a new cycle will be started without waiting for the work piston to return to the end of its stroke. This greatly increases the speed with which riveting and other operations may be performed since a new cycle may be started as soon as the press plunger has released the headed rivet and has been placed in operative relation to another rivet.

A safety valve 103 is advantageously provided to protect the pump against excessive pump pressures which may be developed through improper adjustment of the pre-loaded control springs or otherwise. Such valve controls a short-circuiting passage 104 which leads from the pump line 31 and returns the pump fluid to the reservoir through passage 105. Valve spring 106 is therefore loaded so as to permit release of the valve before excessive pressures are reached. Such loading should be great enough to prevent the valve from opening under pump pressures required for normal operation of the apparatus.

On the return stroke of the intensifier piston 25 a very substantial volume of oil must be discharged from the intensifier cylinder 23 and also the work cylinder. To effect such discharge smoothly and without the development of excessive oil velocities (which produce oil heating and involve the development of excessive pressures and fluid hammer), the oil is advantageously released directly from intensifier cylinder 23 through a substantially large port 107 and is not required to return through the passages from whence it came. Such port is in the present instance controlled by dumping valve 108 in the form of a balanced or spool valve whose end 109 normally blocks or closes port 107. The valve is in this instance opened by the development of pressure in return line 37 (which must precede the return of the work piston and intensifier plunger), such pressure being communicated through pipe 111 to the valve cylinder 112 and opening port 107. The oil may thus be speedily discharged through ports 107 and 113 in the valve cylinder, thereby very substantially reducing the instantaneous pressure which would otherwise be required to return the intensifier piston and very substantially increasing the speed at which the intensifier piston may be returned (without exceeding practical oil pressures and velocities) to initial position. The avoidance of such high pressures not only results in a much smoother cycle of operations but eliminates the possibility of premature operation of the pressure responsive device or the relief valve 103. For without the dumping valve the oil inertia at the beginning of the return stroke would result in the immediate development of pressure high enough to operate control device 30, and if, to avoid such premature operation, its spring loading be increased, then the relief valve 103 would be operated.

Valve 109 is returned to closed position as soon as pressure for the forward stroke of the work piston develops in line 36. The latter is communicated through pipe 114 to the opposite end of valve cylinder 112.

More than one press unit may be operated from a single power unit provided the press units operate either simultaneously or successively. For example, a single operator may require two or more riveting yokes, one yoke being specially designed to reach rivets which cannot be set by a standard yoke. Since only one riveter is operated at a time, a single power unit may be employed in conjunction with a control device which connects the power unit with the riveter about to be used and prevents the accidental or deliberate operation of any other riveter connected to the same unit, while the first-named riveter is thus connected. The apparatus is here shown provided with such a controlling device which may advantageously be in the form of a shuttle valve 115 (see Figs. 1 to 4) which operates to connect the pressure fluid delivered from the unit through the pipe 116 with the unit in use.

As shown in Fig. 4, the high pressure lines 117 and 118 from the respective work cylinders communicate with the shuttle valve cylinder 119 through ports 121 and 122. The shuttle valve is in the present instance in the form of a balanced spool valve which is adapted to connect the pressure fluid delivered through port 123 with either port 121 and 122 depending upon the position of the shuttle valve. The return lines 124 and 125 from the respective work cylinders are connected through passages 126 and 127 in the shuttle valve block with the return line 29. Inasmuch as the high pressure line is under selective control, it is unnecessary to control the return lines. They may be in communication at all times with return line 29. When pressure develops in the latter line, it simply is applied as static pressure to any inactive work cylinder. A drain pipe 128 is connected with ports 129 to the shuttle valve cylinder at points beyond the shuttle valve to drain away any fluid which may leak past the ends of the shuttle valve and return the same to reservoir 19.

The shuttle valve is in this instance operated by solenoids 131 and 132 connected, as presently explained, in circuits controlled by the control switches on the respective press units. The solenoid armatures or cores operate the shuttle valve yokes 133 connected with the projecting shuttle valve rods 134. Energization of one solenoid shifts the valve to one position where it remains until the first solenoid is deenergized and the other is energized to reverse the position of the valve. Mere energization of the other solenoid is not sufficient to effect shifting since its initial power is not great enough to overcome that of the first solenoid which, in its closed position, develops substantially more power than the other develops in its open position. In the present arrangement the energization of the main solenoid 45 is made impossible until the shuttle valve has been shifted to one operative position. A circuit through the main solenoid 45 cannot be closed while the shuttle valve is in intermediate position. For this purpose the control mechanism is provided with a switch 135 advantageously in the form of a double pole switch of conventional design which in both its upper and lower positions closes a circuit through the main solenoid 45. The aforesaid switch is here shown operated by a cam 136 carried by yoke 133 (see Fig. 2) which in one position depresses the switch plunger 137 to close one pair of contacts 139 and in the extreme position allows the aforesaid plunger to rise to connect the other pair of contacts 138. The switch spring 141 is arranged to press the plunger 137 upwardly when cam 136 clears the plunger roller 142.

Fig. 5 illustrates one appropriate circuit arrangement. Preferably a transformer 143 is employed to step down the voltage of supply lines 144 to impose only a relatively low voltage on the lines leading to the push button switches 50 on the respective press units (in this instance designated #1 and #2), and double pole relay switches 145 and 146 controlled by the low voltage circuits are employed to deliver normal line voltage to the operating solenoids. Thus when the circuit is closed in #2 press unit, the relay coil 147 controlling relay contactor 145 is energized, thereby closing the circuit through shuttle valve solenoid 131 shifting the solenoid to the position illustrated in Fig. 2 and closing the circuit through the power operating solenoid 45. It will be noted that the operating solenoid 45 is in circuit both with the switch 135 and with the respective relays 145 and 146 and requires the closing of switch 135 and one of the relays in order to establish a circuit which would energize the operating solenoid 45. Thus if the push button circuit be opened at any time during the cycle of operation, its relay switch 145 would open, thereby de-energizing solenoid 45 and making possible the same control of the press piston as above described in connection with the operation of a single press unit.

Upon de-energization of one shuttle valve solenoid, the other may be energized to shift the valve to connect its press with the power unit. Accidental operation of any idle press is impossible.

More than two press units may be operated by a single power unit by duplicating the shuttle valve and its controlling apparatus, that is, by connecting other shuttle valves with the high pressure outlets 117 and 118 leading from the preceding shuttle valve and connecting a pair of press units to each of the former shuttle valves.

The piston of the work cylinder may be provided, if desired, with the device disclosed in our copending application, Serial No. 159,874, filed August 19, 1937, since issued as Patent No. 2,283,124, for facilitating the starting of a new cycle of operations at an intermediate point in the return stroke of the work piston. Such device is of great utility in riveting and similar operations where rapidity of operation is important.

This application is a continuation in part of our copending application, Serial No. 91,630, since issued as Patent No. 2,241,645.

Obviously the invention is not limited to the details of the illustrative construction since these may be variously modified. Moreover it is not indispensable that all features be used conjointly since various features may be used to advantage in different combinations and subcombinations.

Having described our invention, we claim:

1. In apparatus of the character described, the combination comprising a work cylinder and piston, a source of primary fluid pressure, an intensifier including a large and small cylinder and piston, controlling means for directing primary pressure successively into the work cylinder for advancing the work piston and against the large intensifier piston for intensifying the pressure in the work cylinder and then into the opposite side of the work cylinder for returning the work piston, means responsive to a predetermined pressure against the return face of the work piston for interrupting said return pressure, means including an additional port in said large intensifier cylinder and a fluid operated valve for opening said additional port to prevent premature operation of said pressure responsive means during return of said intensifier piston, and fluid pressure lines connected with said valve for opening and closing the latter, said lines being open to pressure supplied to said work piston.

2. In an intensifier press or the like, the combination comprising a work cylinder and piston, a source of primary pressure fluid, an intensifier including a low pressure intensifier cylinder, controlling means for supplying primary pressure to discharge a relatively large volume of fluid from said low pressure intensifier cylinder, an additional discharge port for said intensifier cylinder, a pressure operated valve for opening said port, pressure supply lines leading to said valve for opening and closing the latter, said lines being connected with pressure supply to the respective ends of said work cylinder to close said valve upon advance of said work piston and to open said valve upon commencement of return of said work piston to minimize discharge velocities from said low pressure intensifier cylinder.

3. In an intensifier press or the like, the combination comprising a work cylinder and piston, an intensifier including low and high pressure pistons and cylinders, a source of primary fluid pressure, means for controlling supply of primary pressure successively to said work cylinder and said intensifier for advancing and returning the work and intensifier pistons, an additional discharge port in said low pressure intensifier cylinder, a fluid operated valve controlling said port, and fluid pressure supply lines connected with said valve for operating the latter, said lines being controlled by said supply controlling means for subjecting the respective sides of said valve successively to primary pressure simultaneously with supply of pressure to said work cylinder to open and close said additional port, thereby minimizing discharge velocity from said low pressure intensifier cylinder.

4. In an intensifier press or the like, the combination comprising a work cylinder and piston, an intensifier including a low pressure piston and cylinder, a source of primary fluid pressure, means for controlling supply of primary pressure to said work cylinder to advance said work piston and to return said work and intensifier pistons, a discharge port in said low pressure intensifier cylinder, a fluid operated valve controlling said port, and fluid pressure supply lines connected with said valve for opening and closing the latter, supply of pressure to said lines being controlled by said supply controlling means for subjecting the respective sides of said valve successively to primary pressure simultaneously with its supply to the work cylinder to open said valve immediately upon supply of return pressure to said work cylinder and to close said valve upon supply of pressure to advance said work piston.

5. In a power unit for supplying pressure fluid to operate a press piston or the like, the combination comprising means for supplying pressure fluid to operate said piston, a control valve movable to forward, neutral and return positions for effecting the forward and return strokes of said piston, means for moving said valve to forward position, a spring adapted to return the valve to neutral position, a cocking device for increasing the deflection of said spring for moving said valve to return position, a lever actuated upon the movement of said valve to forward position for setting said cocking device, and means operative near the conclusion of a cycle of said piston for releasing said cocking device to permit the return of said valve to neutral position.

6. In a power unit for supplying pressure fluid to operate a press piston or the like, the combination comprising means for supplying pressure fluid to operate said piston, a control valve movable to forward, neutral and return positions for effecting the forward and return strokes of said piston, means for moving said valve to forward position, a spring adapted to return the valve to neutral position, a cocking device for increasing the deflection of said spring for moving said valve to return position, means operative upon the movement of said valve to forward position for setting said cocking device, and means for releasing said cocking device during the return stroke of said press piston to condition said spring for registering said valve to neutral position.

7. In an intensifier press the combination comprising a work cylinder and piston, a source of primary pressure fluid, an intensifier including a low pressure piston and cylinder, controlling means for applying primary fluid pressure to said intensifier cylinder for intensifying the pressure in said work cylinder during a portion of the work stroke of said work piston, said controlling means also applying pressure to return the intensifier piston and to discharge said low pressure intensifier cylinder, the latter having an additional discharge port of substantial size and a short discharge passage leading directly to discharge separate from and independently of said controlling means to permit direct discharge thereof without excessive fluid velocities and independently of said controlling means, a valve for opening and closing said discharge port, and means operative prior to the beginning of intensifier operation to close said valve and operative at the beginning of return of said intensifier piston to open said valve.

VICTOR W. PETERSON.
OTTO J. MAHA.